United States Patent [19]

Hendriks

[11] 4,244,191
[45] Jan. 13, 1981

[54] GAS TURBINE PLANT
[75] Inventor: Rudolf Hendriks, Velp, Netherlands
[73] Assignee: Thomassen Holland B.V., De Steeg, Netherlands
[21] Appl. No.: 971,535
[22] Filed: Dec. 20, 1978
[30] Foreign Application Priority Data Jan. 3, 1978 [NL] Netherlands ............ 7800077

[51] Int. Cl.³ .............................................. F02C 3/08
[52] U.S. Cl. .................................................... 60/728
[58] Field of Search ........... 60/728, 39.51 R, 39.16 R, 60/39.18 B; 415/199.1, 199.2

[56] References Cited

U.S. PATENT DOCUMENTS 2,575,683  11/1951  Price ..................................... 60/728
3,796,045  3/1974  Foster-Pegg ........................... 60/728
4,003,204  1/1977  Bradley ............................. 60/31.18 B

*Primary Examiner*—Stephen A. Kreitman
*Attorney, Agent, or Firm*—Silverman, Cass & Singer, Ltd.

[57] ABSTRACT

A gas turbine plant including a compressor section and a turbine section housed within a multipart casing with the shafts of each section co-axial, the compressor section including a double-sided low pressure radial compressor, a high pressure radial compressor and an intercooler, while the turbine stage includes a first stage axial turbine on the same shaft as the compressor and at least an additional turbine stage; a heat exchanger or regenerator being included in the turbine exhaust.

8 Claims, 8 Drawing Figures

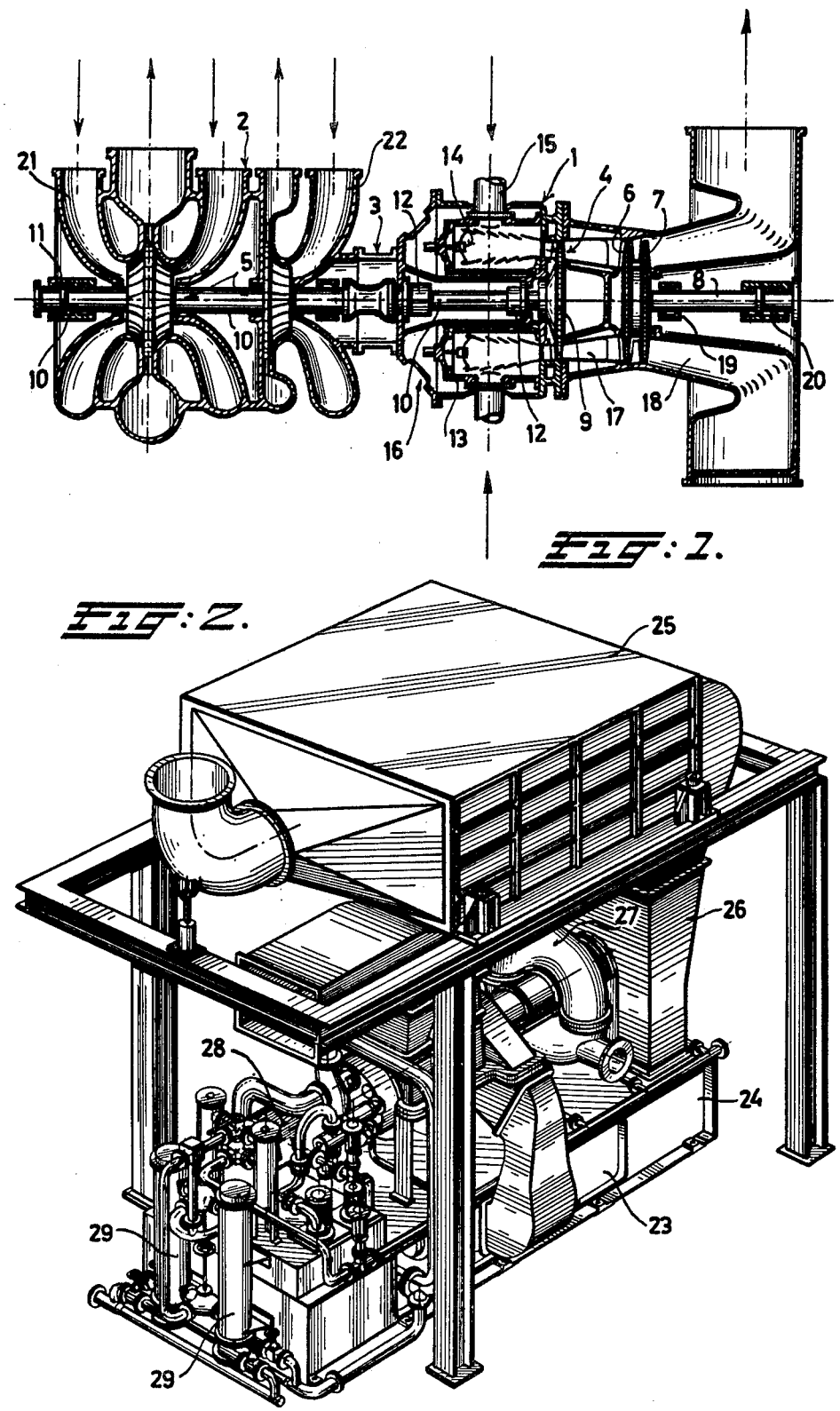

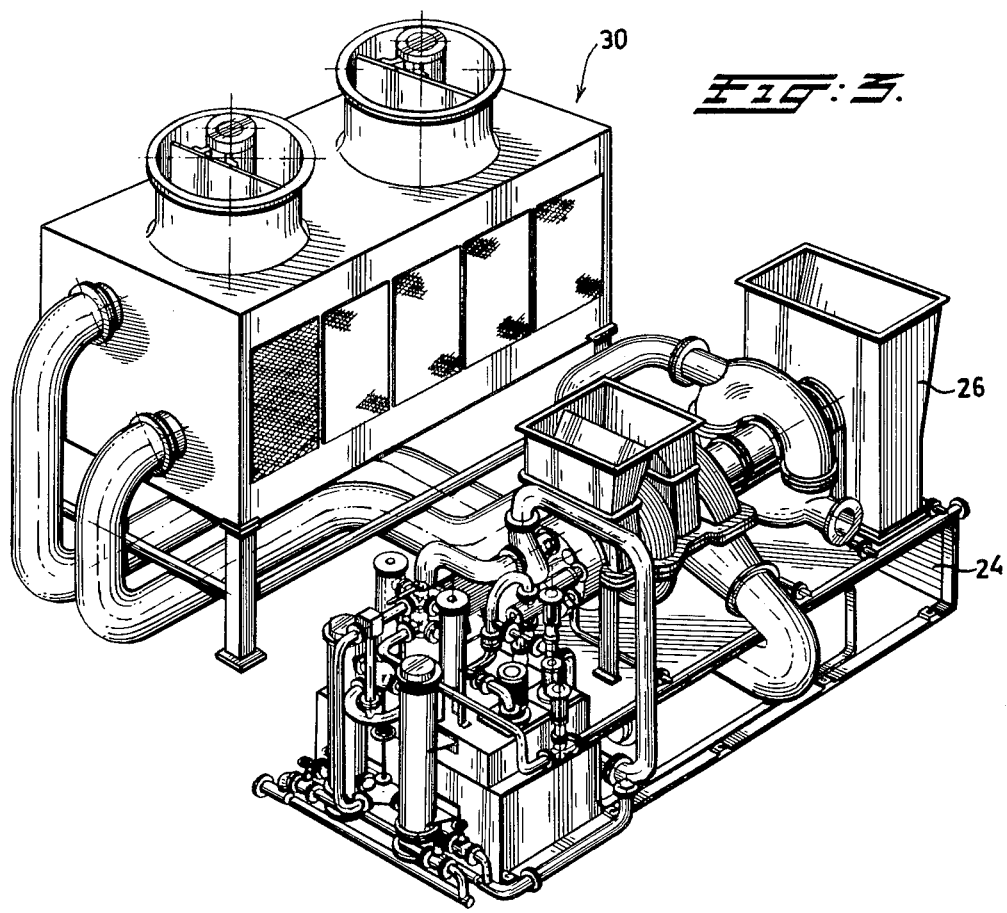

GAS TURBINE PLANT

BACKGROUND OF THE INVENTION

The present invention relates to a gas turbine plant, especially but not exclusively a plant for the 6,000–10,000 kW range, comprising a multipart casing in which a turbine and a radial compressor are combined on co-axially arranged shafts. A gas turbine plant in the ranges of 6,000–10,000 kW, constitutes a useful and efficient addition to existing gas turbine plants. With this object in mind it has been considered that a similar novel concept will have a possibility of succeeding only if a good yield of at least 40% is achieved without the cost or price being increased thereby.

SUMMARY OF THE INVENTION

According to the present invention there is provided a gas turbine plant comprising a multipart casing within which a turbine section and a radial compressor section are mounted on co-axial shafts, the turbine section including an axial single stage turbine followed by at least one axial turbine stage and the compressor section including a double-stage radial compressor the low pressure stage of which is double sided, a compressor inter-cooler and a heat exchanger being disposed in the outlet of the gas turbine.

The application of a compressor inter-cooler has the result that there occurs a saving in the power required for the air-compression. In this manner, a single stage axial turbine with a favorable stage output will suffice for driving the compressor. Without compressor intercooling a multi-stage turbine would be necessary. A single stage turbine has a lower need of cooling air than a multi-stage turbine as a result of which the output of the gas turbine plant is influenced positively.

The inter-cooling will reduce the inlet temperature of the air in the second compressor stage by about 150° C. In connection herewith a higher amount of heat will be transmitted from the exhaust gases to the air supplied by the compressor. Via the regenerator a compensation is obtained for the extra amount of fuel needed for heating the compressor air to the inlet temperature of the turbine. In this case, there is mention of a "regenerative intercooled cycle".

The invention relates more particularly to a plant in which down-stream from the axial single stage turbine two axial turbine stages are provided. As a result of this arrangement, there is sufficient space available for bringing about the correct shape in the transition between the first and the second axial turbine, while also the diffuser behind the latter turbine has sufficient space for restricting losses of flow to a minimum in these places.

The conception described above may be carried out with a single shaft, but in a preferred embodiment there are two shafts, the compressor with the axial single stage turbine being arranged on one shaft and the last axial turbine stages being arranged on the other shaft.

The output of the plant may be raised still further by the combination of the regenerative cycle with a so-called "bottoming cycle", for instance a Rankine cycle. This system is particularly useful for generating either mechanical energy from heat at a low temperature level, or the lost heat of the gas turbine plant in exhaust gases and compressor inter-cooler. In a Rankine cycle, compression of the medium applied takes place in the liquid phase and expansion in the gas phase, in a closed circuit.

SURVEY OF THE DRAWINGS

FIG. 1 is a longitudinal sectional elevation of a gas turbine plant;

FIG. 2 is a perspective view of a first variant in which the heat of the intermediate cooler is carried off by means of water;

Figure 4:
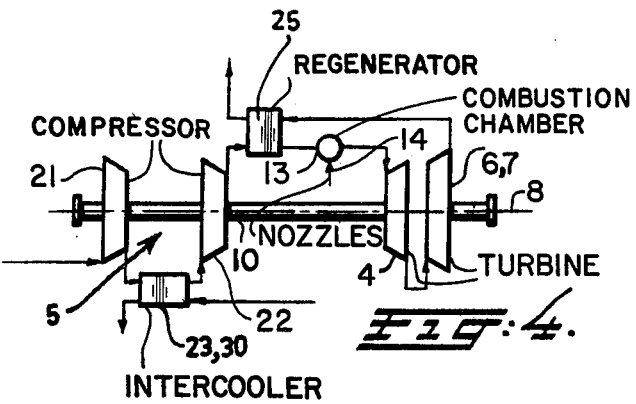
Figure 5:
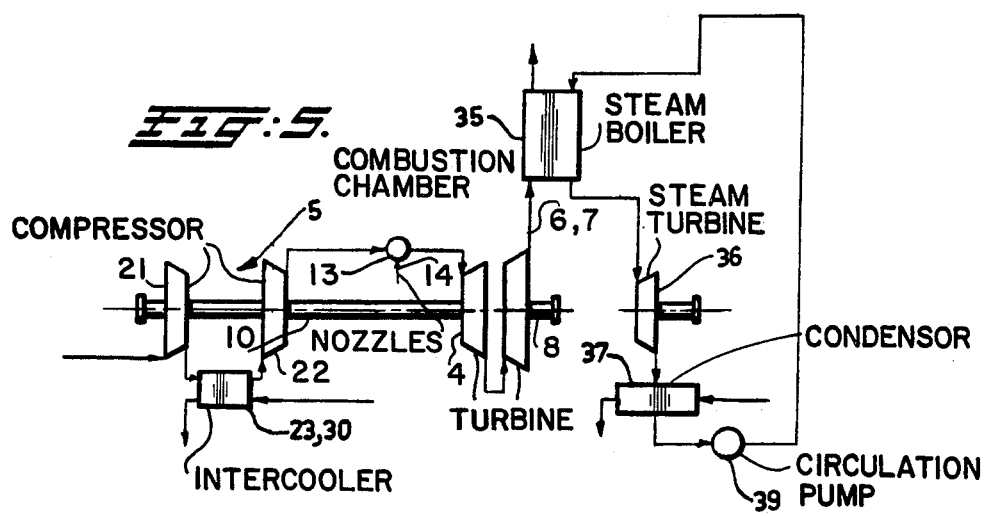
Figure 6:
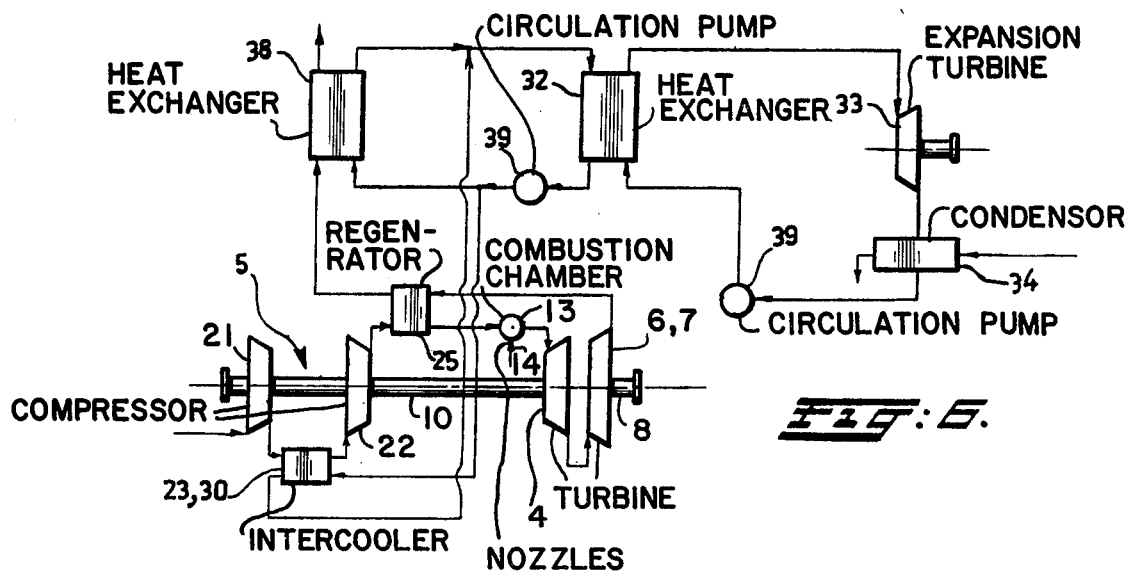

FIG. 3 also shows a perspective view of a further variant in which the heat of the intermediary cooler is carried off by means of air;

FIGS. 4–6 show schematically three possible arrangements of a plant, and

Figure 7:
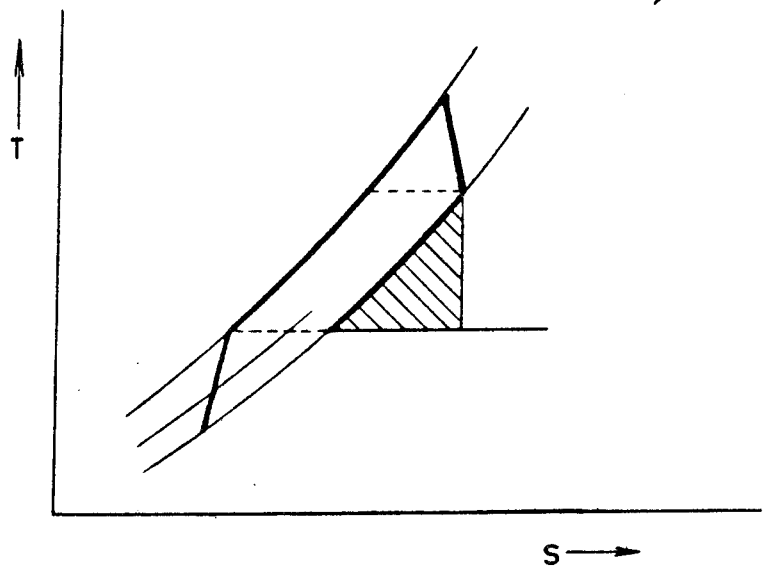
Figure 8:
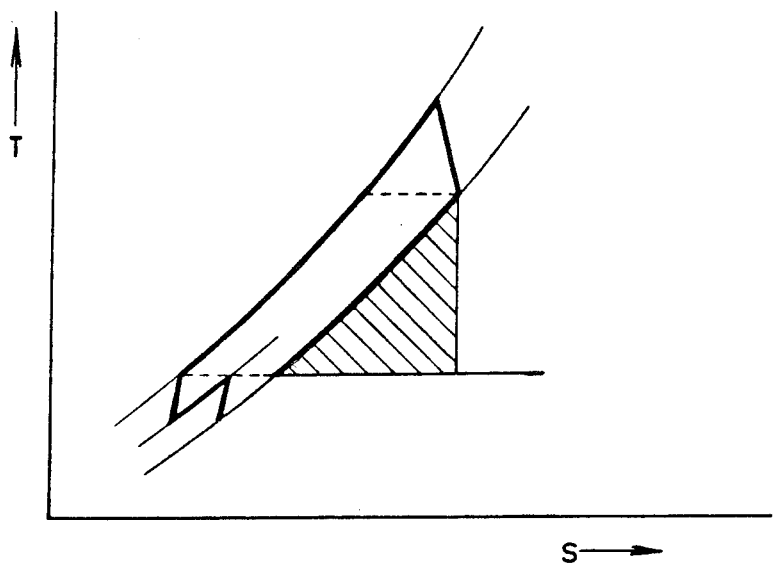

FIGS. 7 and 8 each show a diagram showing the effect of the application of intermediate cooling in a double-stage compressor.

DESCRIPTION OF PREFERRED EMBODIMENTS

A plant comprises a turbine casing 1 and a compressor casing 2 each of which is made up of a number of smaller parts and each of which is supported separately. Between the casings 1 and 2 there is arranged a tubular intermediate member 3. Within the casing 1 there is arranged an axial single stage turbine 4, while within the casing 2 there is arranged a double-stage radial compressor 5. The turbine 4 is followed by two axial turbine stages 6 and 7. The rotor of the double-stage turbine is arranged on a shaft 8 and the rotor 9 of the single stage turbine 4 and the compressor 5 is arranged on a multipart shaft 10, the left portion of the shaft 10, being supported by bearings 11 and the right portion by bearings 12.

The turbine 4 is provided with an annular combustion chamber 13 having a number (for instance sixteen) of nozzles 14. The combustion air emanating from compressor 5 enters the casing 1 via some (for instance four) radial inlet conduits 15 which debouch in a chamber 13. The casing 1 is provided with some apertures 16. Between the rotor 9 of the turbine 4 and the following turbine stage 6 there is arranged a transition piece 17, while an outlet diffuser 18 is arranged behind the turbine stage 7. The support of the rotor of the turbine 6, 7 is effected near the ends of the shaft 8 by means of the bearings 19, 20. The bearing 20 on the right side in FIG. 1 is a combined radial and axial bearing. One of the bearings 11 and 12 of each shaft portion 10 is a combined radial and axial bearing too.

The compressor 5 is made up of a double-sided low pressure stage 21 the rotor of which is arranged on the left-hand portion of shaft 10 and the rotor of the high pressure stage 22 of the compressor is located on the same shaft portion. The shaft 10 is co-axial with the shaft 8 of the turbines 6, 7. As may be seen from FIG. 2, the plant is provided with a compressor inter-cooler 23 which is placed in the foundation 24 of the machine. This variant is intended for application in a place where cooling water is available.

The drawing shows furthermore very schematically a heat exchanger or regenerator 25 which is connected with the outlet 26 from the turbines 4, 6, 7, and the conduit 27 between the compressor stage 22 and the inlet conduits 15. Furthermore, in FIG. 2 the starting motor 28 and some lubricating oil coolers are visible.

FIG. 3 shows a variant with an air/air cooler 30. For the sake of clarity, the regenerator has not been shown in this Figure. This embodiment is suitable for situations in which no cooling water is available, for instance in a desert area.

The plant described above makes it possible to achieve a high output. In the first place, the application of the compressor inter-cooler 23, 30 in combination with the regenerator 25 (see FIGS. 4–6) contributes thereto. In the second place, the application of an axial single stage turbine 4 with a favorable stage output made possible by the application of the compressor intercooler, contributes to the high output of the plant. Without the inter-cooling a multistage turbine would be required. A single stage turbine demands a smaller amount of cooling air than a multistage turbine as a result of which the output of the gas turbine plant is favorably influenced. In the plant according to the invention, this combination is also particularly favorable in that the ratio between the amount of inlet air and the capacity of the plant is smaller than that of the greater part of the turbine plants now known.

With a view to raising the output of the gas turbine plant the regenerative intercooled cycle may be combined with a so-called bottoming cycle, for instance a Rankine cycle. A plant of this nature is illustrated in FIG. 6 and comprising a closed system heat exchanger 32, expansion turbine 33, condensor 34 and circulation pump 39 which operates with a medium with a low latent heat of evaporation, such as Freon. In the embodiment shown in FIG. 6 an additional cycle with water as the medium is provided its purpose being to collect the heat available in the exhaust gases via a heat exchanger 38 and the heat available in the compressor inter-cooler 23 and of supplying it to the medium of the Rankine cycle via heat exchanger 32. The circulation of the water and Freon is provided by circulation pumps 39.

Another advantage of the application of this cycle leading to greater safety is the fact that the medium of the Rankine cycle cannot contact directly the hot portions of the gas turbine.

In certain circumstances, application of a steam cycle comprising a closed system of steam boiler 35, steam turbine 36 and condensor 37 (see FIG. 5) to the outlet from the turbines may be favorable. In this case, the regenerator is not applied.

FIGS. 7 and 8 give an illustration of the advantages which will be achieved by the application of the intermediate cooler 23 or 30 arranged between the two stages 21 and 22 of the compressor 5. In. FIG. 7 the hatched portion shows the amount of heat still present in the exhaust gases which is available for raising the temperature of the compressed air prior to combustion. From FIG. 8 it appears that as a result of the application of the intermediate cooling a larger amount of heat is available. In the plant according to FIG. 6, the amount of heat exhausted into the inter-cooler 23, 30 may still be utilized in the water cycle between the heat exchangers 32 and 38.

Summarizing, it may be observed that the plant according to the invention presents various important advantages. As a result of the possibility of the application of a high gas temperature on the inlet side of the turbine 4, the output (see FIG. 8) may be raised. As a result of the application of the inter-cooling in the compressor 5, the requisite power for this compressor may be provided by the single stage axial turbine 4 so that the axial turbine 6, 7 is fully available for the power to be supplied by the shaft 8. It is a further favorable element that the bearings 19, 20 of the turbine shaft 8 are located in the relatively cool portion of the plant.

Finally, there follows a numerical example of the most important parameters of a plant according to the invention:

| | |
|---|---|
| amount of air | 25 N/sec |
| inlet temperature compressor stage 21 | 15° C. |
| exhaust temperature compressor stage 21 | 160° C. |
| inlet temperature compressor stage 22 | 30° C. |
| exhaust temperature compressor stage 22 | 180° C. |
| compression ratio stage 21 | 3:1 |
| compression ratio stage 22 | 3:1 |
| yield regenerator 25 | 85% |
| inlet temperature of turbine 4 | 1115° C. |
| power compressor 5 | 6300 kW |
| power turbine 6, 7 | 7350 kW |
| number of revolutions turbine 6, 7 | ± 9200 RPM |
| total yield of the plant according to FIG. 4 | 44.5% |
| total output of the plant acording to FIG. 5 | 44.5% |
| total output of the plant according to FIG. 6 | 51% |

The most important applications of the plant according to the invention are considered to be:
1. driving of gas conveying compressors;
2. driving of pumps and compressors in oil and gas production;
3. generation of electricity;
4. propulsion of ships.

What is claimed is:
1. A gas turbine plant comprising:
a multipart casing within which are mounted a turbine section including turbines and a radial compressor section including compressors;
the turbine section including an outlet, an axial single stage turbine in driving connection with the compressors and at least one axial turbine stage mounted on an output shaft, the driving connection and output shaft being separate from one another;
the compressor section including a double-stage radial compressor having a high and a low pressure stage, the low pressure stage being double sided;
a compressor inter-cooler arranged between the low pressure stage and the high pressure stage; and
a heat exchanger disposed in the outlet of the turbine section.
2. The plant as claimed in claim 1 in which the at least one axial turbine stage includes two axial turbine stages.
3. The plant as claimed in claim 1, in which the driving connection includes a first shaft, the compressors and the axial single stage turbine being arranged on the first shaft and the first shaft and output shaft being coaxial.
4. The plant as claimed in claim 1 in which a steam boiler is arranged in the outlet of the turbine section for the production of steam.
5. The plant as claimed in claim 4, including a steam cycle in the turbine outlet, the cycle comprising a closed circuit including a steam boiler, a steam turbine, a condenser and a circulation pump.
6. The plant as claimed in claim 1 including a heat exchanger in the outlet of the turbine section in combination with a Rankine cycle, the Rankine cycle comprising a closed circuit including a heat exchanger, an expansion turbine, a condenser and a circulation pump and the medium within the circuit having a low evaporation temperature.
7. The plant as claimed in claim 6 including an intermediate cycle with water as a medium, the intermediate cycle including a closed circuit comprising heat exchangers and a circulation pump.
8. The plant as claimed in claim 6 or claim 7, in which the medium in the circuit of the Rankine cycle is Freon.

* * * * *